United States Patent
Chuah et al.

(10) Patent No.: US 6,449,272 B1
(45) Date of Patent: Sep. 10, 2002

(54) MULTI-HOP POINT-TO-POINT PROTOCOL

(75) Inventors: Mooi Choo Chuah, Eatontown, NJ (US); Girish Rai, Bartlett, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/074,745

(22) Filed: May 8, 1998

(51) Int. Cl.[7] ............................................. H04L 12/66
(52) U.S. Cl. ........................ 370/389; 370/466; 709/203; 709/217; 709/230
(58) Field of Search ................................ 370/352, 320, 370/331, 389, 392, 401, 420, 466, 473; 709/201, 203, 217, 218, 230, 232, 236

(56) References Cited

U.S. PATENT DOCUMENTS

| | | | | |
|---|---|---|---|---|
| 6,055,575 A | * | 4/2000 | Paulsen et al. | 709/229 |
| 6,061,346 A | * | 5/2000 | Nordman | 370/352 |
| 6,094,437 A | * | 7/2000 | Loehndorf, Jr. et al. | 370/420 |
| 6,108,350 A | * | 8/2000 | Araujo et al. | 370/467 |
| 6,112,245 A | * | 8/2000 | Araujo et al. | 709/228 |
| 6,118,785 A | * | 9/2000 | Araujo et al. | 370/401 |

* cited by examiner

*Primary Examiner*—Alpus H. Hsu
*Assistant Examiner*—Roberta Stevens
(74) *Attorney, Agent, or Firm*—Joseph J. Opalach; Matthew J. Hodulik

(57) ABSTRACT

A virtual dial-up service is provided via multiple Internet Service Provides (ISPs). In particular, a remote user accesses the virtual dial-up service by establishing a connection to a serving ISP. The Serving ISP establishes a first tunnel to an anchor ISP. The latter establishes a tunnel to, e.g., a private intranet. As a result, a virtual private network (VPN) service is provided that enables remote access, via multiple tunnels, to a private network.

31 Claims, 18 Drawing Sheets

MULTI-HOP POINT-TO-POINT PROTOCOL

CROSS-REFERENCE TO RELATED APPLICATIONS

Related subject matter is disclosed in the co-pending, commonly assigned, U.S. Patent application of Chuah et al., entitled "A Mobile Point-to-Point Protocol," Ser. No. 09/074,582, filed on even date herewith.

FIELD OF THE INVENTION

This invention relates generally to communications and, more particularly, to packet communications systems.

BACKGROUND OF THE INVENTION

One use of the Internet as a communications vehicle is as an enhanced data back-bone for coupling together workgroups to provide what is referred to as a "virtual private network" (VPN). One application of a VPN is in a corporate environment such that employees, e.,g., at home, can remotely access, via the Internet, corporate data networks. A VPN provides security, and authentication, for a remote user to join a closed user group notwithstanding the use of public facilities. In effect, the use of a VPN provides a WAN-like vehicle to the corporation and its employees. (Although the corporate network could also provide direct remote access, e.g., a user dials directly into the corporate network, there are economic advantages to the use of a VPN.) To provide a VPN, tunneling protocols are used such as the "Point-to-Point Tunneling protocol" (PPTP) and the "Layer 2 Forwarding" (L2F) protocol. Generally speaking, a tunnel protocol enables the creation of a private data stream via a public network by placing one packet inside of another. In the context of a VPN, an IP packet is placed inside another IP packet. In an attempt to develop an industry standard, the Internet Engineering Task Force (IETF) is developing the "Layer 2 Tunneling Protocol"(L2TP), which is a hybrid of the PPTP and L2F protocols (e.g., see K. Hamzeh, T. Kolar, M. Littlewood, G. Singh Pall, J. Taarud, A. J. Valencia, W. Verthein; *Layer Two Tunneling Protocol*"L2TP"; Internet draft, March, 1998).

For a remote user, a typical form of access to a VPN is via a "plain-old-telephone service" (POTS) connection to an "Internet service provider" (ISP) that provides the VPN service. For example, a user incorporates an analog modem into a personal computer, or equivalent, and has a customer account with a particular ISP, referred to herein as the "home" ISP. (It is also assumed that the user's personal computer is properly configured to support one of the above-mentioned tunneling protocols.) The user accesses the VPN by simply making a data call to the home ISP, e.g., dialing a telephone number associated with the "home" ISP and then "logging in" to the VPN.

SUMMARY OF THE INVENTION

We have realized that the above-described tunneling protocols do not allow a remote user to log into any ISP other than their home ISP for accessing a VPN. In today's mobile world this is significantly limiting, especially when viewed in the context of a Personal Communications Service (PCS) wireless environment in which the user may physically change their location during the call. In other words, as the remote user changes location, the home ISP may, at least temporarily, be no longer available to the user—thus blocking the user from accessing the VPN.

Therefore, and in accordance with the invention, a packet server establishes a multi-hop tunnel between other packet endpoints and relays messages between portions of the multi-hop tunnel. Thus, a remote user is allowed to access a VPN via a visiting ISP in addition to their home ISP.

In an embodiment of the invention, a virtual dial-up service is provided via multiple Internet Service Provides (ISPs). In particular, a remote user accesses the virtual dial-up service by establishing a connection to a serving ISP. The Serving ISP establishes a first tunnel to an anchor ISP. The latter establishes a tunnel to, e.g., a private intranet. As a result, a virtual private network (VPN) service is provided that enables remote access, via multiple tunnels, to a private network.

DETAILED DESCRIPTION

As noted, this application is related to the above-mentioned, co-pending, U.S. patent application of Chuah et al. As such, the detailed description is divided into a three sections for ease of reference.

Multi-Hop Point-to-Point Protocol

Figure 1:
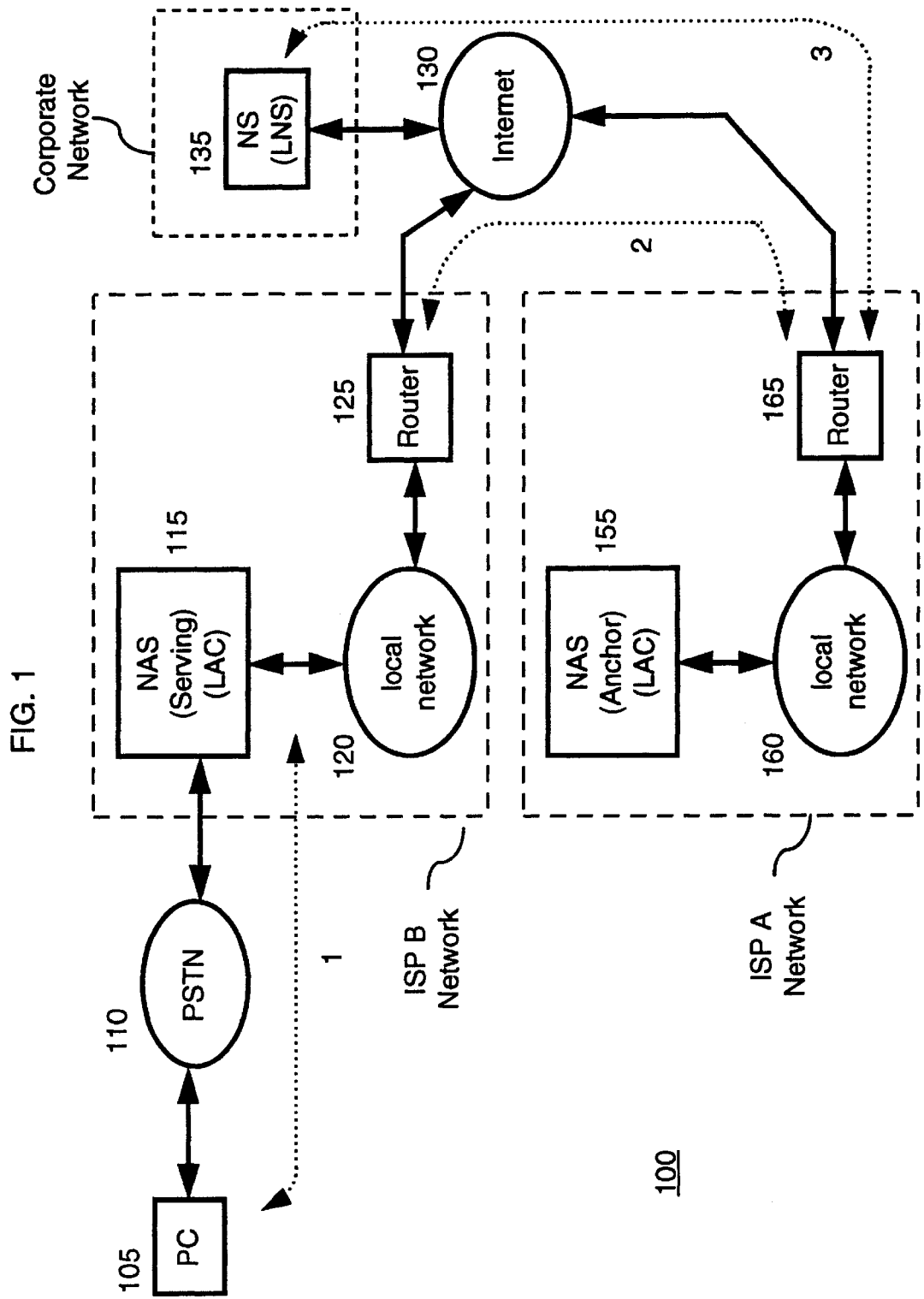
FIG. 1 shows a communications system in accordance with the principles of the invention.

FIG. 1 shows an illustrative communications system 100 in accordance with the principles of the invention. Other than the inventive concept, the elements are well-known and will not be described in detail. For example, personal computer (PC) 110 includes data communications equipment (not shown) for dial-up access through public-switched-network (PSTN) 110 to ISP B for establishing an Internet connection. Likewise, the solid lines between elements of communications system 100 are representative of well-known communications facilities between the respective endpoints, e.g., the connection between PC 110 and PSTN 110 is representative of a local loop connection, the connection between ISP B and Internet 120 is supported by asynchronous transfer mode (ATM) over a synchronous optical network (SONET), etc. Further, its assumed that the reader is familiar with the above-mentioned L2TP protocol.

As can be observed from FIG. 1, communications system 100 comprises two ISPs: ISP A, represented by ISP A Network, and ISP B, represented by ISP B Network. The ISP B Network comprises Network Access Server (NAS) 115, which includes a point-of-presence (POP) router (not shown) as known in the art, a local network 120, and a router 125. Similarly, the ISP A Network comprises NAS 155, a local network 160, and a router 165. It is assumed that ISP A provides a VPN service for remotely located employees to access an illustrative Corporate Network via Network Server (NS) 135, which provides, among other functions, a routing and firewall capability. (The Corporate network is assumed to be e.g., a collection of local area networks (not shown) suitably protected behind NS 135.)

We have observed that a remote user may, even if only temporarily, be located in a portion of the country that is not served by ISP A but is, instead, served by ISP B. Further, ISP A may desire to extend such VPN coverage to other areas. Therefore, and in accordance with the principles of the invention, a remote user is allowed to access a VPN via a visiting, or serving, ISP in addition to their home, or anchor, ISP. (Although it is assumed that ISP A and ISP B are different service providers, this is not necessary to the inventive concept, e.g., they could just be separate networks within the same ISP.) Thus, a user (not shown) located at PC 105 can access the corporate network while, e.g., roaming, about the country.

At this point, the following definitions are assumed:

mL2TP—the L2TP protocol as defined in K. Hamzeh, T. Kolar, M. Littlewood, G. Singh Pall, J. Taarud, A. J. Valencia, W. Verthein; *Layer Two Tunneling Protocol*"L2TP"; Internet draft, March, 1998; plus mnodifications as described herein;.

LAC—mL2TP Access Control, i.e., an NAS that supports mL2TP;

LNS—a NS that supports mL2TP;

Anchor LAC—a LAC that supports tunneling to the LNS for providing a VPN Service; and Serving LAC—a LAC that supports tunneling to the Anchor LAC.

(These definitions are used to simplify an illustrative description of the inventive concept. As such, and as those in the art will realize, the inventive concept is not so limited and can be applied to any tunneling protocol and associated processing equipment.)

In accordance with the inventive concept, the ISP A network illustrates an Anchor LAC 155 and the ISP B network illustrates a Serving LAC 115. As described further below, and in accordance with the principles of the invention, communications system 100 of FIG. 1 provides a multi-hop tunnel. The example of FIG. 1 illustrates a two-hop tunnel. One hop is from the ISP B Network to the ISP A Network and the other hop is from the ISP A Network to the Corporate Network.

Figure 2:
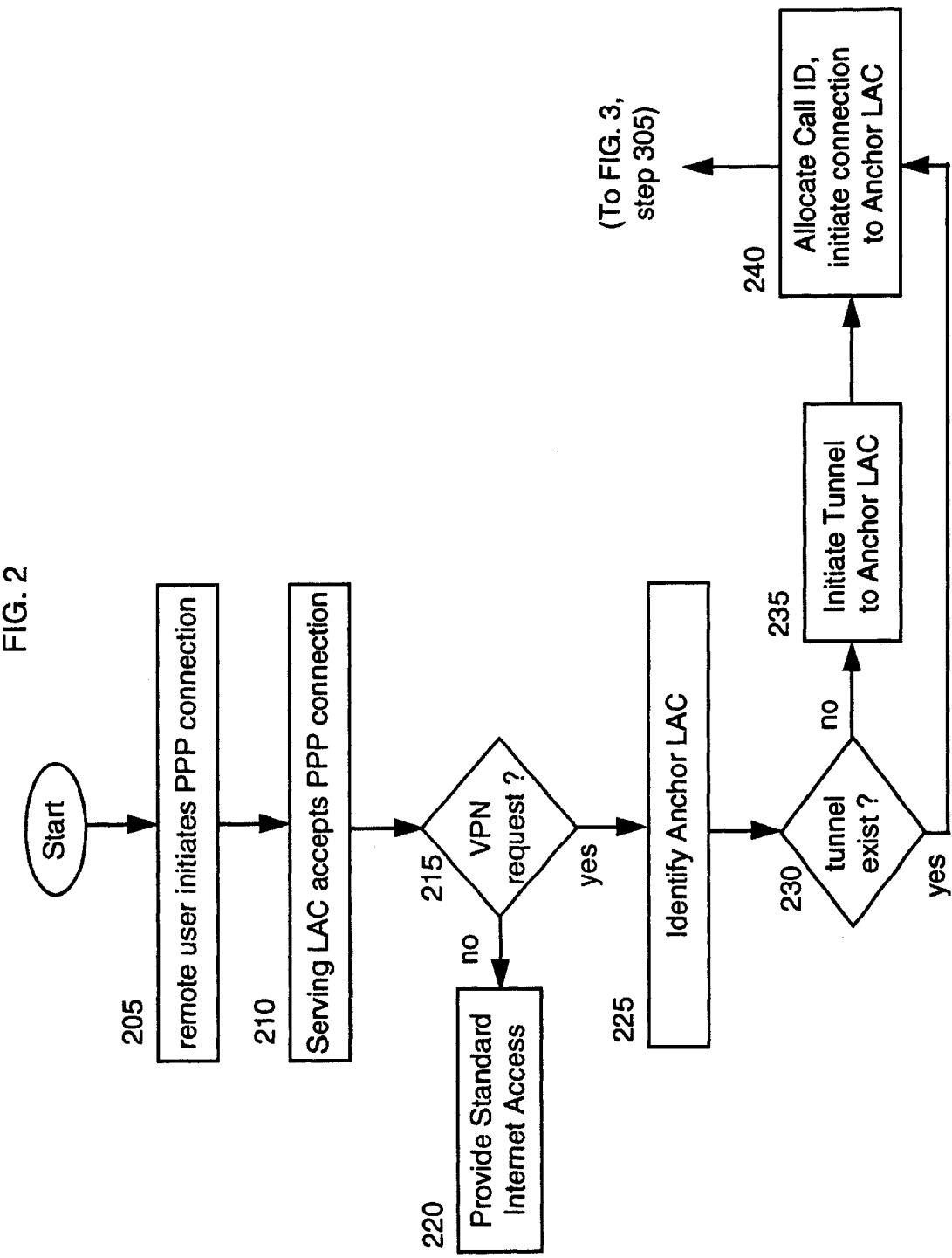
FIGS. 2–3 show flow charts of illustrative methods for use in the communications system of FIG. 1.

Reference should now be made to FIG. 2, which shows an illustrative high-level flow chart of a method in accordance with the principles of the invention. (It is presumed that Serving LAC 115 and the other respective servers are suitably programmed to carry out the below-described methods using conventional programming techniques, which, as such, will not be described herein.) In step 205, the remote user initiates a PPP (Point-to-Point Protocol) connection to ISP B via PSTN 110. In step 210, Serving LAC 115 partially authenticates the user (e.g., using a predefined "username" and "password") and accepts the connection (represented by dotted line 1 of FIG. 1). (Alternatively, DNIS (dialed number identification service), CLID (calling line identification), or other equivalent forms of identification could be used.) Obviously, if Serving LAC 115 can not authenticate the user, the connection is not accepted (this step is not shown).

(As background, and as known in the art, when a remote user wishes to establish a new PPP session, PC 110 initiates a PPP LCP (Link Control Protocol) Config Request to the Serving LAC. The Serving LAC completes both the PPP LCP and PPP PAP/CHAP phases, as known in the art, with the user's equipment before initiating any communication with the Anchor LAC in accordance with the inventive concept. (For secure Conduits, the IETF has defined two protocols for security over PPP connections—the Password Authentication Protocol ( PAP) and the Challenge-Handshake Authentication Protocol (CHAP) (e.g., see IETF Request for Comment (RFC) 1334, *"PPP Authentication Protocols"*)).

In step 215, Serving LAC 115 determines is the remote user desires to use a VPN service. (This selection could, e.g., be directly associated with particular "usernames" and/or be associated with a separate request from the user, e.g., via a pop-up "HyperText Transport Protocol" (http) from provided by Serving LAC 115 provides standard Internet access is step 220. However, if the remote user desires to use a VPN, then Serving LAC 115 identifies as associated Anchor LAC in step 225 (described below).

Serving LAC 115 stores a VPN table that a priori associates, e.g., a user's identification with a particular Anchor LAC. A portion of such a table is shown below in Table One. In this example, the remote user associated with PC 110 is associated with Anchor LAC ISPA com, i.e., Anchor LAC 155.

TABLE ONE

| User Identification | Anchor LAC |
|---|---|
| username | ISPA.com |

(It should be noted that equivalent structures, or operations, could be used, such as simply maintaining a list of fields formatted as "username@ ISPA com," where the portion after the "@" symbol indicates the Anchor LAC. Alternatively, ISP B may maintain a database mapping users to services. In the case of a virtual-dial-up, i.e., an identification of the remote user as being associated with a VPN service, the mapping further identifies the Anchor LAC. Alternatively, the serving LAC can utilize a Radius Access Request/Response transaction with its local Radius Server for this task, as known in the art.)

In step 230, Serving LAC 115 checks to see if a tunnel exists between itself and Anchor LAC 115. As such, Serving LAC 115 maintains a table, as illustrated in Table Two, below, of current tunnels, represented by a tunnel identification (Tid) value, associated call identifiers (Cid) of calls currently using that tunnel, and the associated Anchor LAC IP address.

TABLE TWO

| Tid | Cid | Anchor LAC IP Address |
|---|---|---|
| 2 | 5 | h.j.k.l |

If no tunnel connection currently exists between the Serving LAC and the Anchor LAC, then a tunnel is initiated by Serving LAC 115 to the Anchor LAC in step 235 (described below). Once a tunnel exists between the Serving LAC and the Anchor LAC, Serving LAC 115, in step 240, allocates a new Cid, updates Table Two, and initiates a session with Anchor LAC 155 by forwarding a VPN request to Anchor LAC 155 via local network 120, router 125, Internet 130, router 165, and local network 160 (described further below). In this request, Serving LAC 115 conveys user identification information to Anchor LAC 155.

Figure 3:
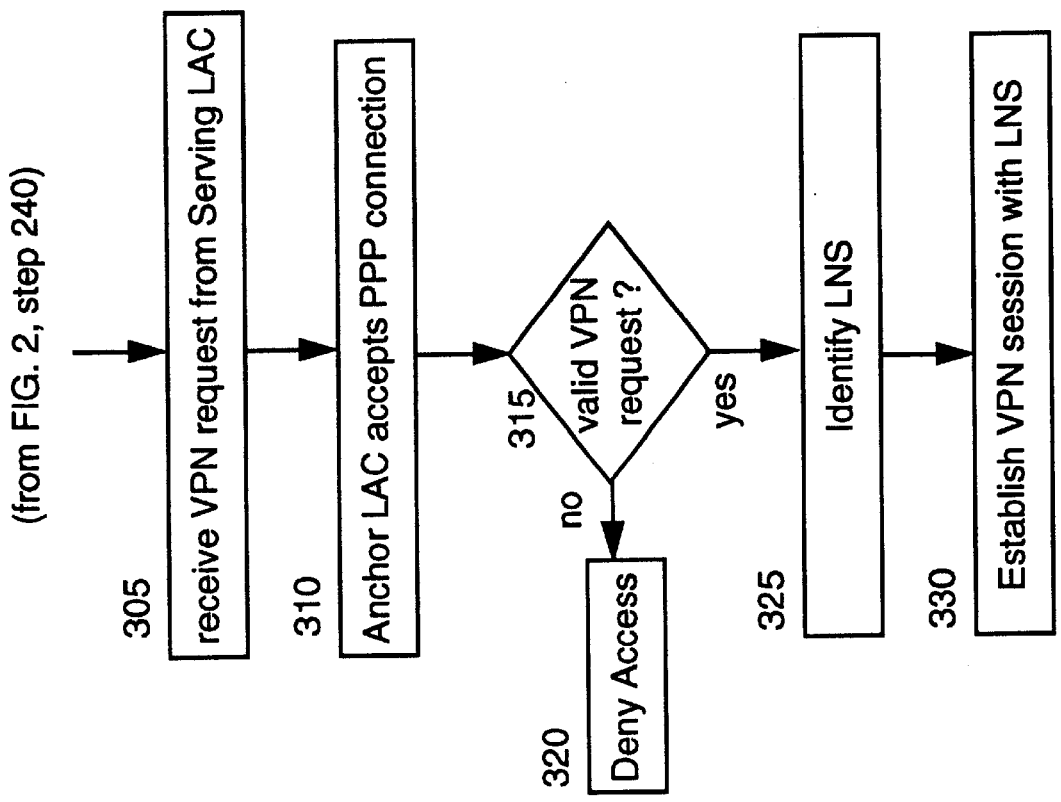

Turning now to FIG. 3, Anchor LAC 155 receives the request in step 305. In step 310, Anchor LAC 155 also performs authentication of the remote user (e.g., using a predefined "username" and "password" as noted above) and accepts the connection (represented by dotted line 2 of FIG. 1). (Alternatively, like the Serving LAC, DNIS, CLID, or other equivalent forms of identification could be used.) If Anchor LAC 155 can not authenticate the user, the connection is not accepted (this step is not shown). (In this case, Serving LAC 115 similarly must convey an error message back to the remote user (not shown).)

Anchor LAC 155 stores a VPN table that a priori associates, e.g., a user's identification with a particular LNS. A portion of such a table is shown below in Table Three. In this example, the remote user associated with PC 110 is associated with LNS 135, represented by IP address g.h.i.j.

TABLE THREE

| User Identification | LNS |
|---|---|
| username | g.h.i.j |

(Similar to Serving LAC 115, it should be noted that equivalent structures, or operations, could be used. For example, the Anchor LAC may also perform this function via Radius Access Request/Response messages with a Home Radius Server.) In step 315, Anchor LAC 155 checks if this is a valid VPN request using Table Three. If this is not a valid request, Anchor LAC 155 denies the request in step 320. If this is a valid request, Anchor LAC 155 identifies the associated LNS from Table Three in step 325.

It is assumed that the Anchor LAC maintains the following connection table for each direction of communication for each established VPN session with a remote user:

TABLE FOUR

| Connection # | Serving LAC Tid | Serving LAC Cid | LNS IP Address | LNS Tid | LNS Cid | LNS IP Address | User Assigned IP Address |
|---|---|---|---|---|---|---|---|
| 5 | 2 | 5 | d.e.f.g | 1 | 3 | g.h.i.j | a.b.c.d |

Anchor LAC associates with each VPN session a connection number. In addition, this connection number is mapped to the respective user. This table lists, by connection number, the Serving LAC IP Address (with associated tunnel. ID) and Call ID values for that hop), and the associated LNS IP Address (with associated tunnel ID and Call ID values for that associated hop). In step 330, Anchor LAC 155 establishes the VPN session (performs an authentication check, etc.). (Again, if LNS 135 should deny the VPN request (e.g., because of no authentication of the remote user or no capacity), appropriate error messages are generated by the Anchor LAC and the Serving LAC.) Other than the inventive concept, the VPN session with LNS 135 is established as in the prior art. For example, and in accordance with the principles of the invention, in establishing a new VPN session Anchor LAC 155 allocates a new Cid and updates Table Four (e.g., adds a new connection). This last connection is represented by dotted line 3 of FIG. 1.

At this point, the connectivity is a point-to-point PPP session whose endpoints are the remote user's networking application on one end (as represented by PC 110) and the termination of this connectivity into LNS 135 PPP support on the other. (It should be noted that accounting, if necessary, can be performed at the Serving LAC, the Anchor LAC, as well as the LNS, i.e., each element may count packets, octets and connection start and stop times.)

In support of the above-described multi-hop virtual dial up service, a form of the L2TP (mL2TP) protocol is used and described further below. As in L2TP, there are two parallel components of mL2TP operating over a given tunnel: control messages between each LAC-LNS pair, and payload packets between the same LAC-LNS pair. The latter are used to transport mL2TP encapsulated PPP packets for user sessions between the LAC-LNS pair. As in L2TP, the Nr (Next Received) and Ns (Next Sent) fields are always present in control messages and are optionally present in payload packets. The control messages and payload messages use different sequence number states. For the above-mentioned LAC/LNS pair scenario, there are no changes to the L2TP draft protocol definition as far as the maintenance and usage of (Nr, Ns) is concerned.

However, as between the connection between the Serving LAC and the Anchor LAC, the Anchor LAC merely monitors the (Nr, Ns) values sent by the Serving LAC. That is, and in accordance with the inventive concept, the Anchor LAC simply re-transmits the values received from the Serving LAC to the LNS. In addition, the Anchor LAC now updates its (State Received, State Sent) values (Sr, Ss), with the corresponding (Nr, Ns) values it has observed from the packets sent by the Serving LAC. Since there will, undoubtedly, be packet losses between the Serving LAC and the Anchor LAC, the Ss (Sr) value at the Anchor LAC may be smaller (smaller) than the Ss (Sr) value at the Serving LAC. In addition, the Anchor LAC maintains two sets of (Sr, Ss) variables, one for the Serving LAC/Anchor LAC control connection and the other for the Anchor LAC/LNS control connection.

Before PFP tunneling can occur, in accordance with the inventive concept, between the Serving LAC, the Anchor LAC, and the LNS, control messages must be exchanged between them. Control messages are exchanged over the same tunnel which will be subsequently used to forward payload data once mL2TP call control and management information have been passed (described below).

In accordance with the inventive concept, additional Attribute Value Pairs (AVP)s (described below) are defined for use in the L2TP control messages (hence becoming mL2TP control messages). These additional AVPs are for supporting the multi-hop features and call transfer features described above. As defined in L2TP, AVPs are used to further specify control signaling.

As noted above, for the above-described LAC/LNS pair case, there is no change to the procedure described in the above-mentioned L2TP draft. As such, only the multi-hop case, requires additional procedures, described below.

Figure 4:
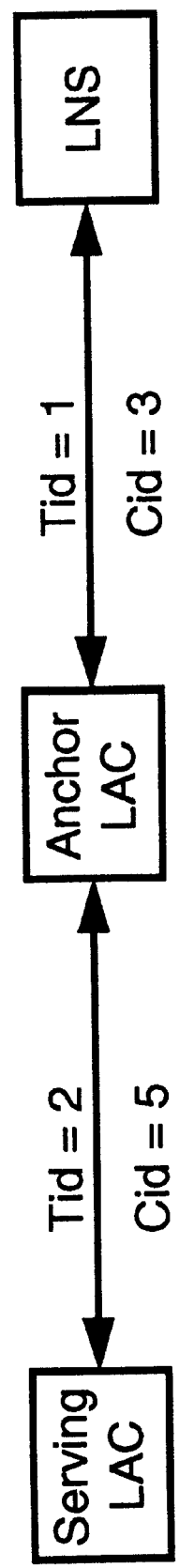
FIG. 4 shows an illustrative multi-hop message flow.

An illustrative multi-hop message flow is shown in FIG. 4. As can be observed from FIG. 4) a tunnel (identified by a Tid value) and a call (identified by a Cid value) are established between the Serving LAC and the Anchor LAC. Similarly, a tunnel and a call are established between the Anchor LAC and the LNS. As shown in FIG. 4, the inventive concept requires the Serving LAC establish a tunnel to the Anchor LAC. In the context of this invention, the Serving LAC treats the Anchor LAC as an LNS and L2TP procedures are used to initially set up the tunnel.

Figure 5:
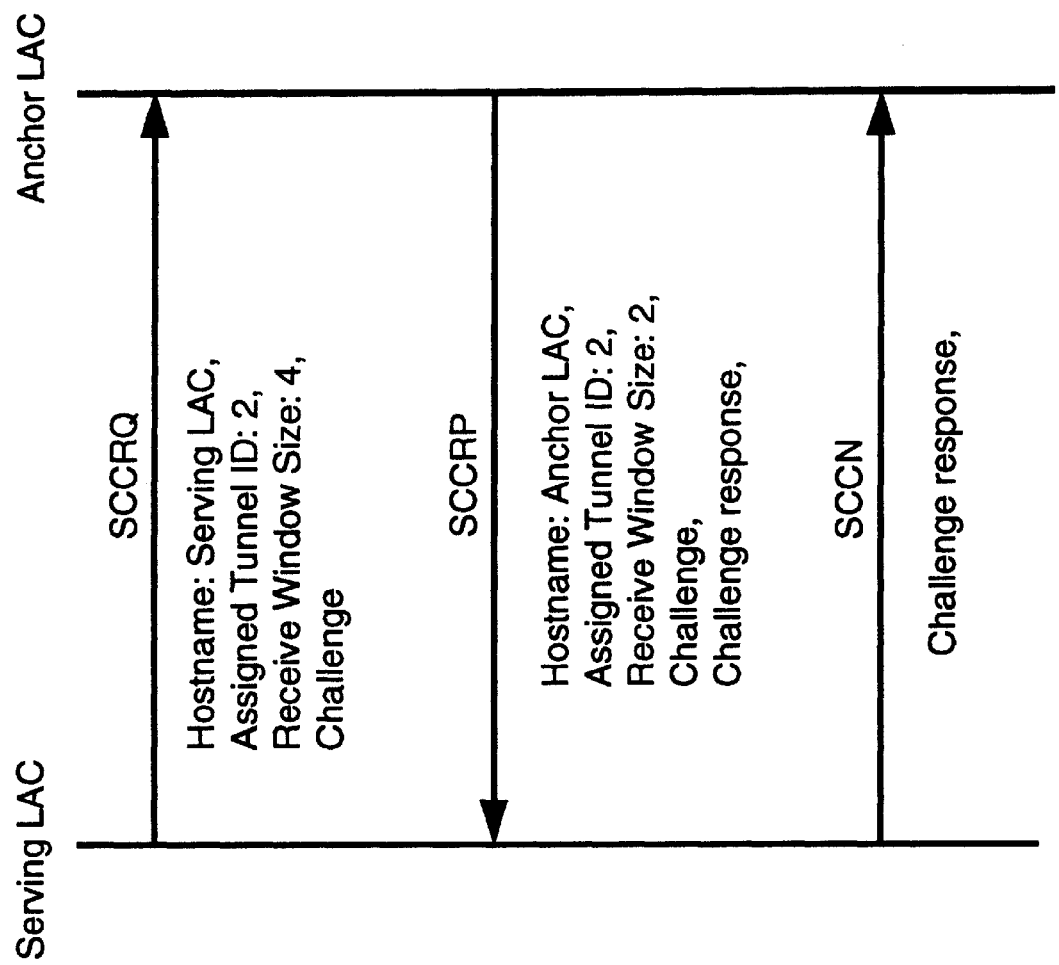
FIGS. 5–7 show illustrative control message transactions.
Figure 6:
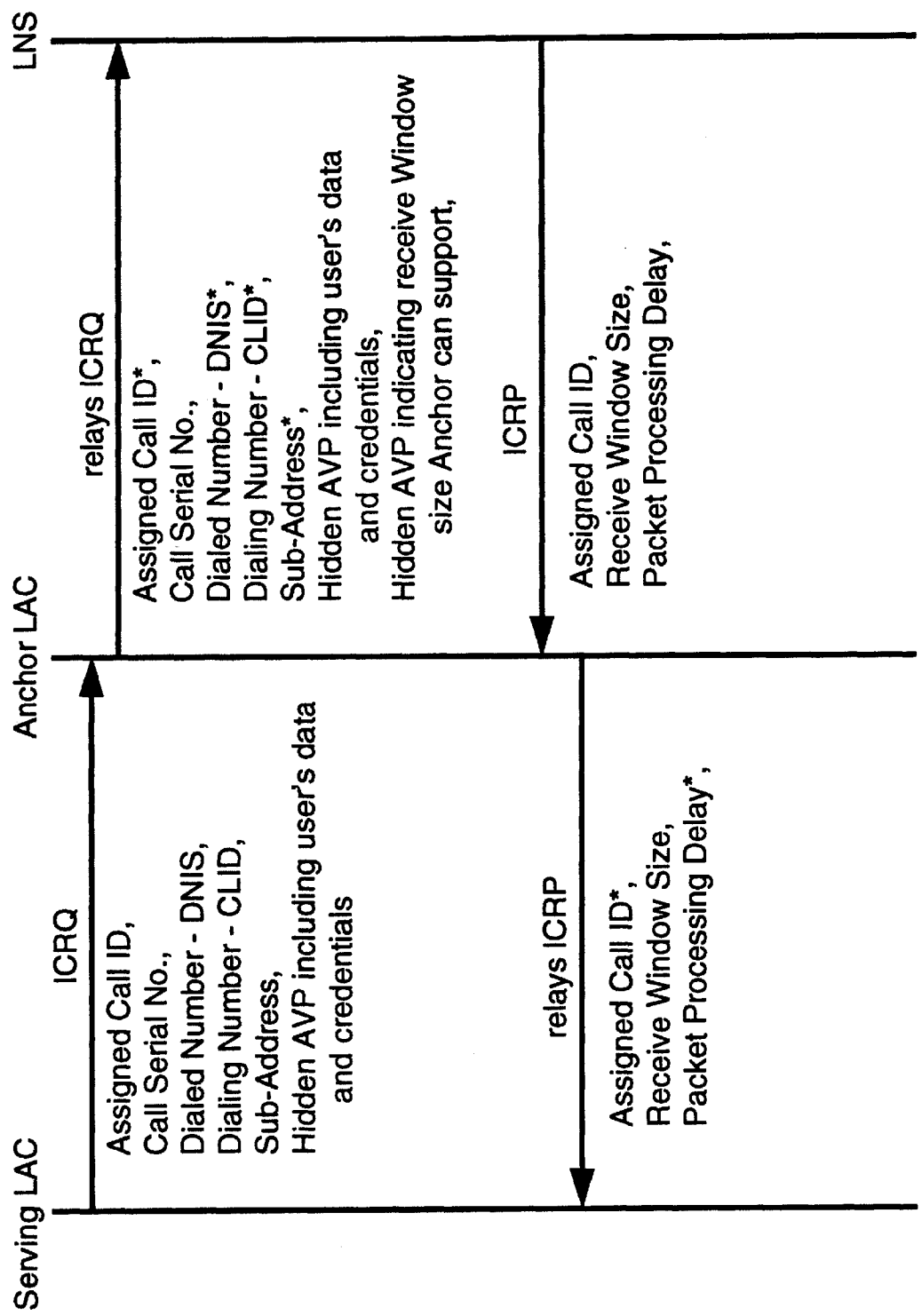
Figure 7:
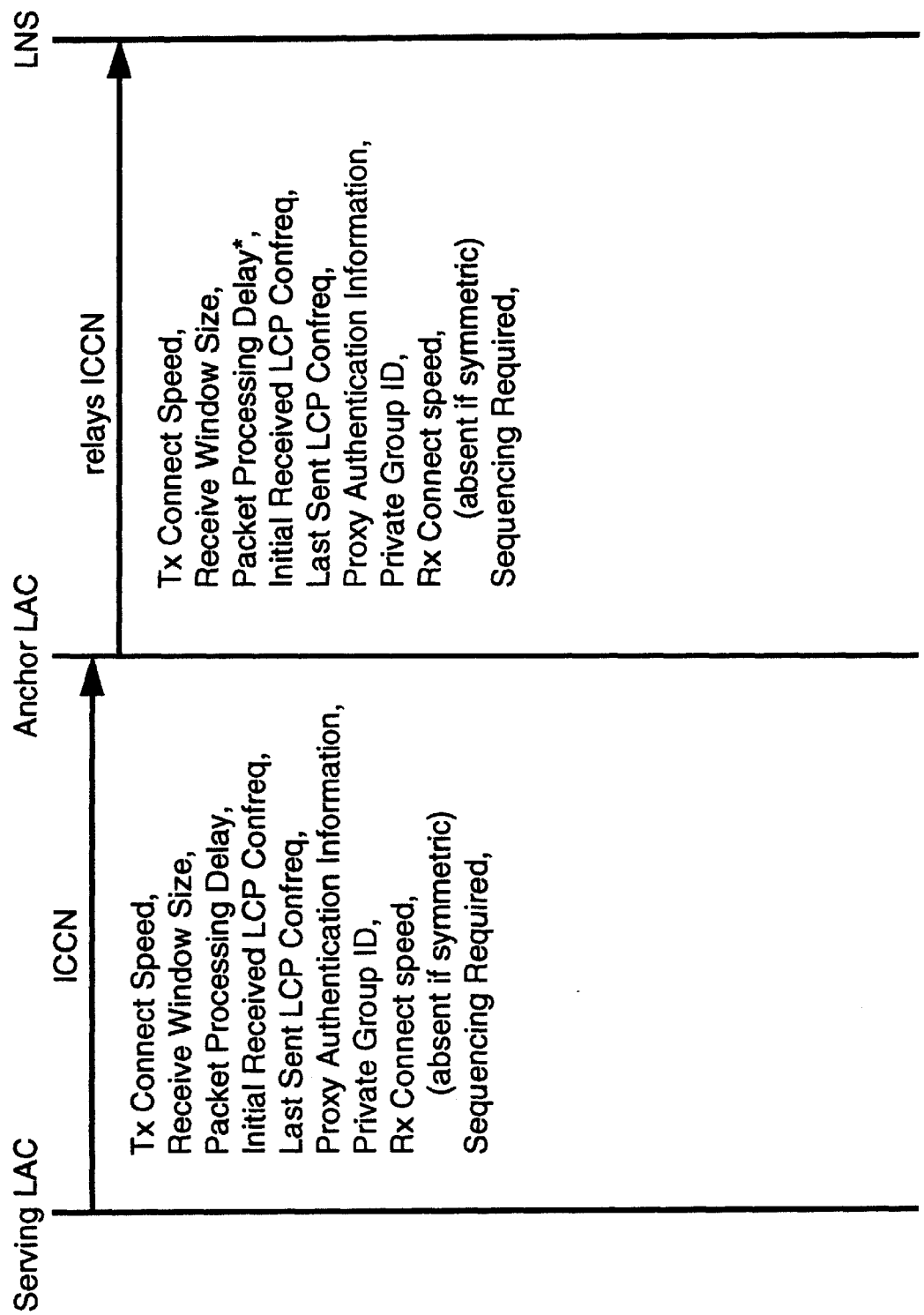

Once a tunnel has been established, a number of control message transactions occur in order to set up a PPP session in accordance with the principles of the invention. These are illustrated in FIGS. 5–7. In these FIGS., only the relevant fields are shown for the various control messages. (Note, if the tunnel-id and call-id for the tunnel between the Serving LAC and the Anchor LAC are different from those values for the tunnel between the Anchor LAC and LNS, the Anchor LAC modifies the relevant fields in the packet headers before relaying them in either direction.) As shown in FIG. 5, the Serving LAC first sends a Start-Control-Connect-Request Message (SCCRQ) message (as defined in L2TP) to the Anchor LAC to configure the tunnel between them. Upon receipt of this message, the Anchor LAC then responds with an Start-Control-Connect-Reply Message (SCCRP) (this occurs subsequent to any above-described authentication). The Serving LAC confirms with a Start-Control-Connection-Connect (SCCCN) message to the Anchor LAC.

Following the start control connection message exchanges shown in FIG. 5, the Serving LAC sends an Incoming-Call-Request (ICRQ) message to the Anchor LAC as shown in FIG. 6. The Incoming-Call-Request message contains sufficient user data and credentials to enable the Anchor LAC to identify the LNS.

As noted earlier, if no tunnel exists between the Anchor LAC and the LNS, the Anchor LAC first initiates the SCCR, SCCRP, SCCCN message exchanges with the LNS as defined in L2TP. Once the tunnel exists, an unused slot within the tunnel, a Cid, is allocated by the Anchor LAC. At this point, and in accordance with the principles of the invention, the Anchor LAC relays the ICRQ message (from the Serving LAC) to notify the LNS of this new dial-up session. As shown in FIG. 6 the Anchor LAC modifies the ICRQ message accordingly before relaying it to the LNS. The modified fields are indicated by a "*" e.g., the assigned call ID. The Anchor LAC also adds a hidden AVP to inform LNS what receive window size it can support. (Note that with the additional hop, the Anchor LAC records the maximum window size negotiated for both the control/payload connections. Also, the window size for the control connection between the Serving LAC and Anchor LAC may be different from that of the control connection between the Anchor LAC and LNS and buffering may be required. To eliminate additional buffering and sequence number monitoring, the Anchor LAC optionally adds an AVP to inform the LNS what receive window size for the payload session the Anchor LAC can support in the Anchor LAC-Serving LAC direction. As a result, the LNS will include only appropriate receive window size values in its ICRP reply and hence only one window size for the payload session in the LNS-Anchor LAC-Serving LAC direction.) As noted earlier, the LNS either accepts the connection or rejects it. Rejections MUST include a result condition and MAY include an error indication. In either case, the LNS sends an Incoming-Call-Reply (ICRP) message to the Anchor LAC as shown in FIG. 6. The Anchor LAC then modifies the ICRP message appropriately and relays it to the Serving LAC in accordance with the invention (again, modified fields are indicated by an "*" in FIG. 6). Since the packet processing delay (PPD) field received from the LNS only includes the processing delay at the LNS, the Anchor LAC add to this value the processing delay at its own node. Then, the ICRQ message is relayed to the Serving LAC.

In response, the Serving LAC sends an Incoming-Call-Connected (ICCN) message to the Anchor LAC as shown in FIG. 7. Inside this message, the Serving LAC passes all the LCP Config Request information as well as the Proxy Authentication Information. That is, the Serving LAC is forwarding the results of the LCP Config Request/Ack, PPP PAP/CHAP performed with the user's equipment. The Anchor LAC modifies the PPD field of the received ICCN message before relaying it to the LNS. (Currently, no use is made the tx connect speed and rx connect speed.) Although not shown, and in accordance with the invention, the Anchor LAC also relays all the Set-Link-Info, Hello and Wan-Error-Notify messages defined in L2TP. (It should be observed that the description above illustrates the concept of multi-hop packet tunnel. For example, FIG. 1 represents a 2-hop packet tunnel.)

It should be observed that the multi-hop mL2TP tunnels described above occur exclusively at the frame layer. As such, actual policies of address management by the LNS are irrelevant to the above-described Virtual dial-up service since, for all purposes of the PPP protocol handling, the remote user appears to have connected at the LNS.

Mobile Point-to-Point Protocol

Figure 8:
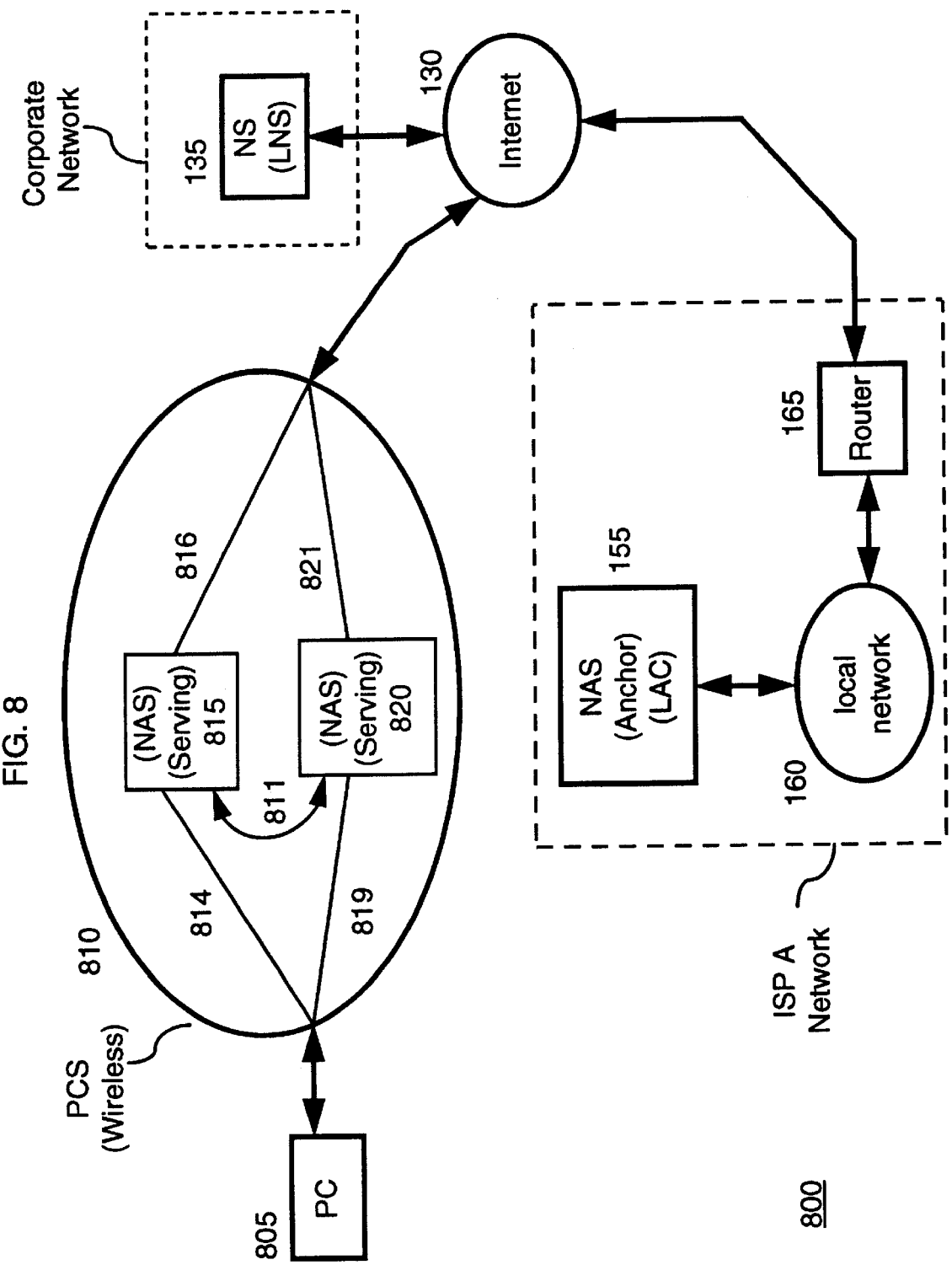
FIG. 8 shows another embodiment of a communications system in accordance with the principles of the invention.

Turning now to FIG. 8, another embodiment of the inventive concept is shown. FIG. 8 is similar to FIG. 1. Other than the inventive concept, the elements are well-known and will not be described in detail. Like numbers indicate like functions and will not be further described except where necessary.

In FIG. 8, PC 805 includes data communications equipment (not shown) for establishing wireless access through Personal Communications Service (PCS) wireless network 810 to the Internet. PCS Wireless services are known in the art and will not be described in detail. PCS wireless network 810 comprises a plurality of mobile switching centers as represented by elements 815 and 820. Each switching center serves a geographical area (not shown). It is assumed that elements 815 and 820 include an NAS, e.g., Serving LACs similar to Serving LAC 115 of FIG. 1. Initially, it is assumed that the remote user establishes a VPN session to the corporate network using the above-described multi-hop technique. In particular, the remote user is in a geographical area such that this initial connection is routed through element 815 via connections 814 and 816. In the context of a wireless PCS application, the initial PPP connection is between element 815 and PC 805. (Although shown as a part of the switching elements for simplicity, the NAS functions could also be performed in separate pieces of equipment. Similarly, the other elements such as a local network and router are not shown for simplicity.)

We have realized that in a wireless environment tunneling protocols, such as L2TP, do not allow a remote user to change the existing PPP connection from one switching element to another. For example, assuming for the moment that FIG. 8 does not embody the inventive concept, when the remote user roams, e.g., to a geographical area served by element 820 (and hence a different NAS) the user's communication session is handed-off to element 820 as known in the art. However, the existing PPP connection —and hence the VPN session—is dropped and must be re-established since, as noted, there is no ability to transfer existing PPP connections from one NAS to another. In this context, the communications system of FIG. 8 overcomes this problem.

Therefore, and in accordance with the invention, an NAS or LAC incorporates a "hand-off" feature that allows the existing NAS to hand-off an existing PPP connection to another NAS. In accordance with this feature, 3 new control messages are defined, namely: (i) Continued Call Request, (ii) Continued Call Reply, and (iii) Continued Call Connect. As a result of the above, the user does not have to terminate the current PPP connection and then re-establish a new PPP connection. These 3 new control messages comprise a L2TP control message header, message identifier (e.g., continued call request, etc.), and a number of fields (described below).

Figure 9:
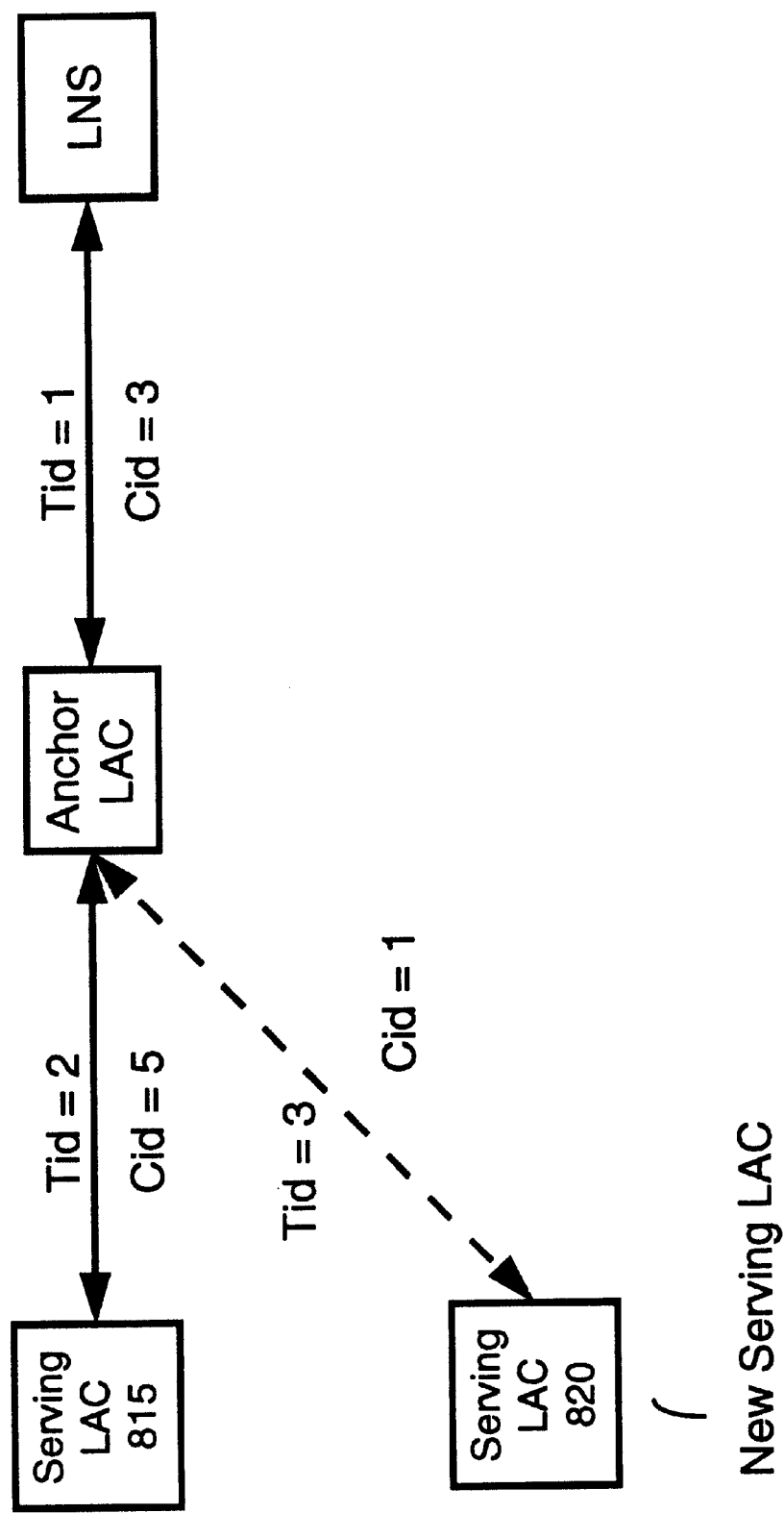
FIG. 9 shows an illustrative hand-off message flow.

In accordance with the inventive concept, an illustrative hand-off message flow is shown in FIG. 9. As can be observed from FIG. 9, a tunnel (identified by a Tid value) and a call (identified by a Cid value) are initially established between element 815, which includes a Serving LAC, and the Anchor LAC. Similarly, a tunnel and a call are established between the Anchor LAC and the LNS. (A method for establishing this initial VPN session was described above.) As shown in FIG. 9, the inventive concept allows the existing Serving LAC to transfer the existing PPP connection to a new Serving LAC, as represented by element 820.

Figure 10:
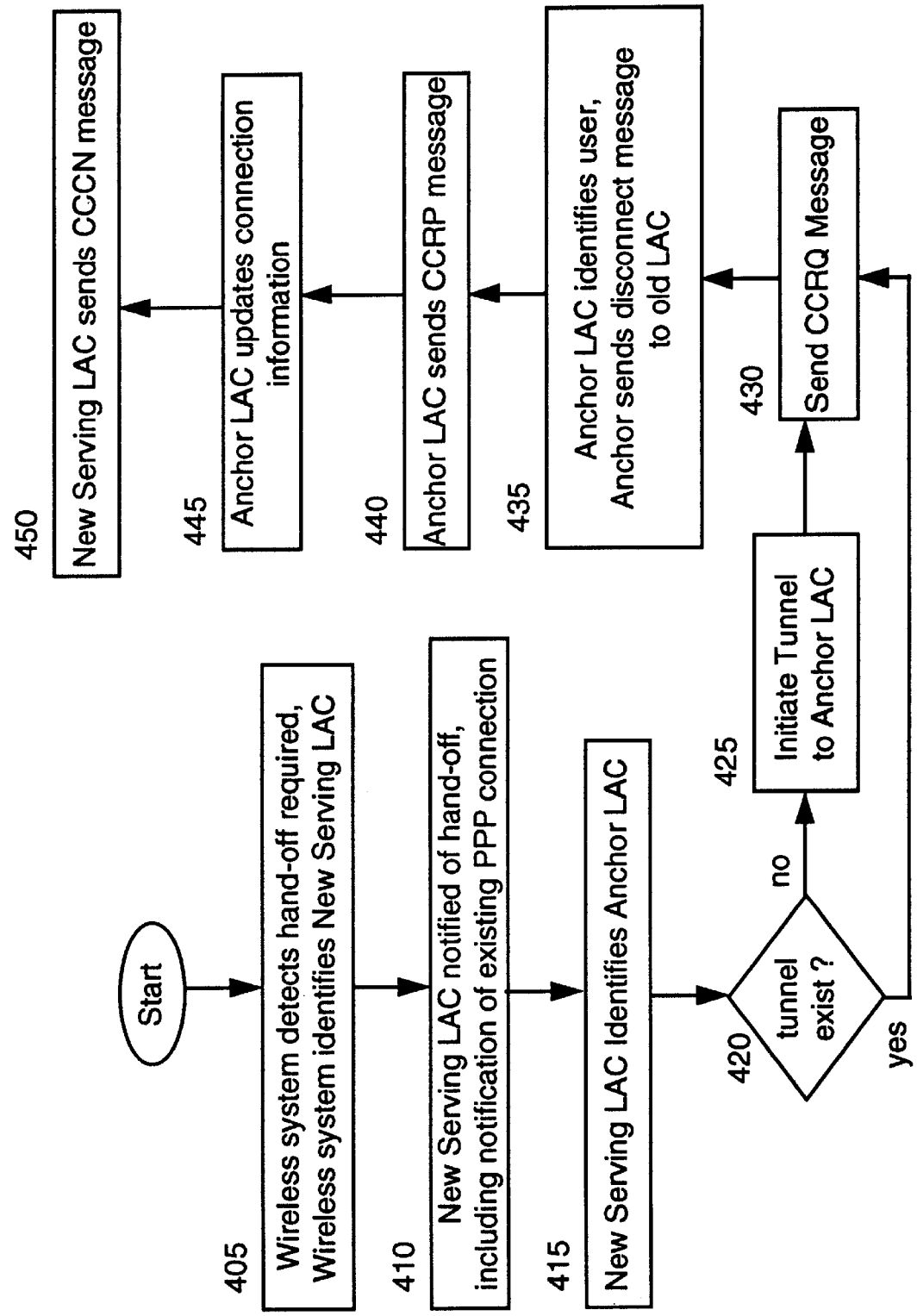
FIG. 10 shows a flow chart of an illustrative method for use in the communications system of FIG. 8.

Reference should now be made to FIG. 10, which is an illustrative flow chart of a method for use in providing a "hand-off feature." As noted, it is assumed that a VPN session exists between PC 805 and the Corporate network via element 815, which includes a Serving LAC, and Anchor LAC 155. In accordance with the inventive concept, PCS wireless network 810 adds to the existing call state variables additional variables indicating the presence (or lack thereof) of a PPP connection for each wireless call, and if a PPP connection exists, PPP connection information that includes the Anchor LAC identification, e.g., the IP address of the Anchor LAC.

In step 405 of FIG. 10, PCS wireless network 810 detects the need for a hand-off because PC 805 has moved from the geographical area served by element 815 to another geographical area, e.g., the area served by element 820, which includes another Serving LAC. In step 410, PCS Wireless system provides element 820 with notification of the impending hand-off. (The method(s) used by a wireless system to detect and prosecute a hand-off are known in the art and not relevant to the inventive concept. As such, they will not be described herein and are represented by signaling path 811 of FIG. 8.) Since the call state information now includes a PPP session indicator and PPP call information, the new Serving LAC (of element 820) identifies the Anchor LAC in step 415. In step 420, the new Serving LAC (of element 820) checks to see if there is an existing tunnel between itself and the identified Anchor LAC, here Anchor LAC 155.

If no tunnel exists, the new Serving LAC first establishes a tunnel (as described earlier) in step 425. Then, and in accordance with the inventive concept, the new Serving LAC sends a Continued-Call-Request (CCRQ) message to the Anchor LAC in step 430. This CCRQ message includes the user's name associated with the existing PPP connection, the Tid and Cid values to be used for the transferred (new) PPP session.

In step 435, the Anchor LAC recovers the user's name from the received CCRQ message and uses this information to determine the LNS and IP address of the old Serving LAC, e.g., from a connection table represented by Table Four, above (this recovered information could also include the respective User Datagram Protocol (UDP) port number). In this step, the Anchor LAC sends a Call-Disconnect-Notify message (e.g., see L2TP) to the old Serving LAC and also identifies in, e.g., Table Four, above, the existing call variables associated with this PPP connection to the remote user, such as old tunnel-id, and old call-id. (On the other hand, if the Anchor LAC should reject the Continued-Call-Request, the Serving LAC either sends a signal back to the user so that the existing PPP session can be torn down and a new PPP session can be initiated or the PPP session is simply dropped (steps not shown).)

In step 440, the Anchor LAC replies with a Continued-Call-Reply (CCRP) message with an appropriate Receive Window Size. The CCRP message includes information on the current Nr and Ns values. In step 445, the Anchor LAC updates its connection table, e.g., Table 4, above, by replacing the entries for the Tid, Cid, and Serving LAC IP address fields (identified in step 435), with the new call information for the existing PPP connection. In step 450, the new Serving LAC stores the Nr, Ns, into its Sr, Ss, values and also stores the receive window size from the received CCRP message, if necessary, and sends a Continued-Call-Connect (CCCN) message to the Anchor LAC, which completes the hand-off.

Figure 11:
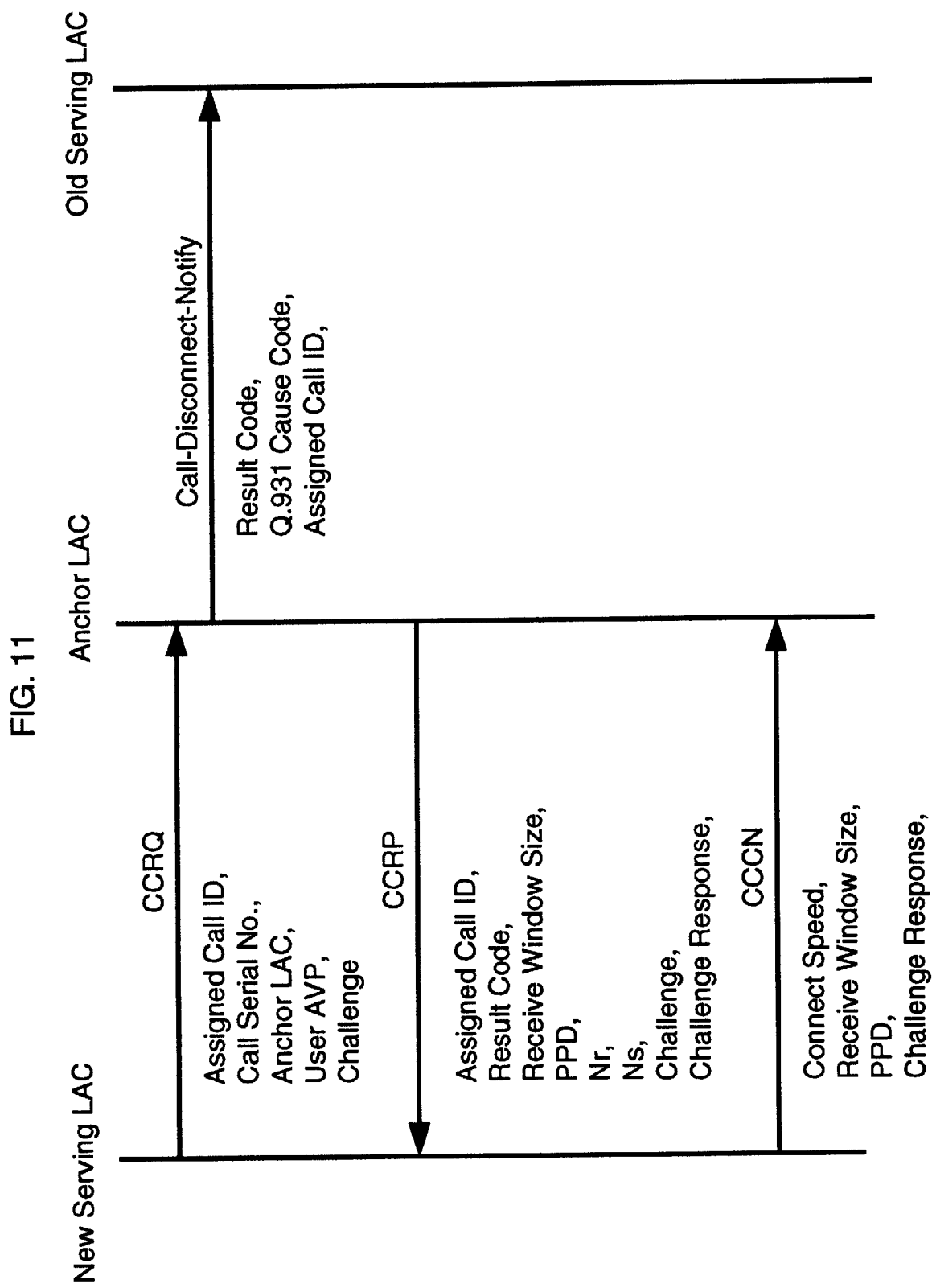
FIG. 11 shows illustrative control message transactions.

In support of the above-described hand-off feature for a PPP protocol, FIG. 11 illustrates the above-mentioned new control message transactions in accordance with the principles of the invention. As shown in FIG. 11, a CCRQ message is sent to the identified Anchor LAC.

A CCRQ message comprises the following fields:
Assigned Cid,
Call Serial No.,
Bearer Type,
Physical Channel ID,
Dialed No.,
Dialing No.,
Sub-Address,
Anchor LAC,
Challenge,
User AVP,
User's name, and
User's MIN/phone.

The Anchor LAC field presumes that this information is available during the hand-off. (Alternatively, if the hand-off process does not provide information about the Anchor LAC to the New Serving LAC, the hand-off process must then provide enough user information to the New Serving LAC so that the New Serving LAC can search for the Anchor LAC information using help from a Foreign Radius Server as known in the art. That is, the New Serving LAC enquires about the Anchor LAC from a Home Radius Server via Radius Access/Response messages.)

The User AVP information includes user information (such at the user's name) and other user credentials, e.g. multi-hop virtual dial up service, user's identity (MIN), service provider's phone number etc.

Subsequent to the CCRQ message, the Anchor LAC sends a Call-Disconnect-Notify message to the old Serving LAC. Then, the Anchor LAC replies with a Continued-Call Reply (CCRP) message that includes the current Sr, Ss values that it maintains.

A CCRP message comprises the following fields:
Assigned Cid,
Result-Code,
Receive Window Size,
PPD,
Nr,
Ns,
Challenge, and
Challenge Response.

Finally, the new Serving LAC replies with a Continued-Call Connect (CCCN) message. CCCN message comprises the following fields:

Connect Speed,

Framing Type,

Receive Window Size,

PPD, and

Challenge Response.

Figure 12:
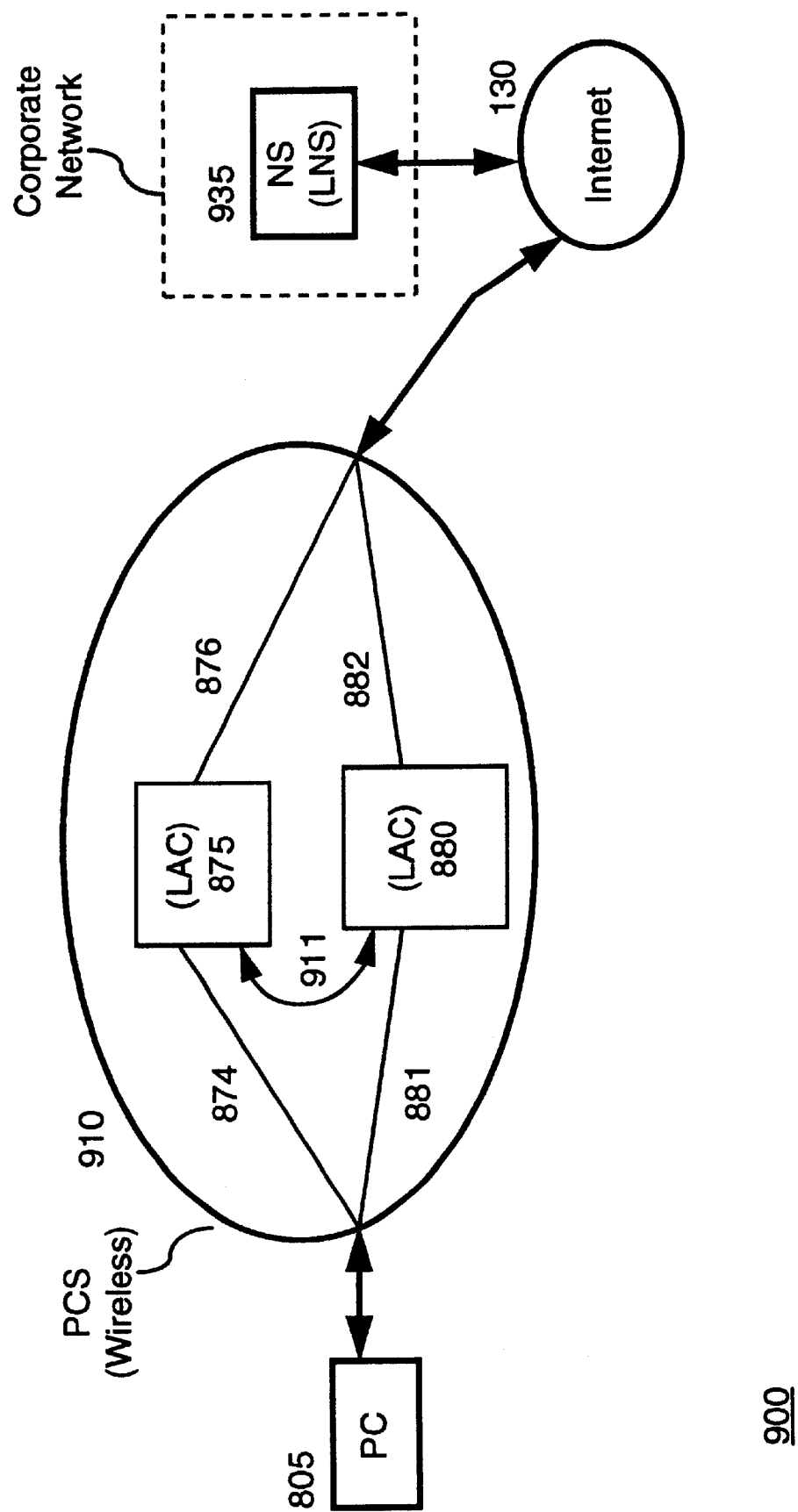
FIG. 12 shows another embodiment of a communications system in accordance with the principles of the invention.

Turning now to FIG. 12, another embodiment of the inventive concept is shown, in the context of transferring an existing PPP connection from one NAS to another NAS, where the old NAS has a connection to the LNS. (In this example, there is no Serving LAC per se, but simply, e.g., an Anchor LAC that is directly supporting an existing PPP connection.) FIG. 12 is similar to FIG. 8. Other than the inventive concept, the elements are well-known and will not be described in detail. Like numbers indicate like functions and will not be further described except where necessary.

In FIG. 12, PC 805 includes data communications equipment (not shown) for establishing wireless access through Personal Communications Service (PCS) wireless network 910 to the Internet. PCS Wireless services are known in the art and will not be described in detail. PCS wireless network 910 comprises a plurality of mobile switching centers as represented by elements 875 and 880. Each switching center serves a geographical area (not shown). It is assumed that elements 875 and 880 include an NAS, e.g., LACs similar to Anchor LAC 115 of FIG. 1. Initially, it is assumed that the remote user establishes a VPN session to the corporate network as known in the art using, e.g., that portion of L2TP. In particular, the remote user is in a geographical area such that this initial connection is routed through element 875 via connections 874 and 876 to LNS 935. In the context of a wireless PCS application, the initial PPP connection is between element 875 and PC 805. (Although shown as a part of the switching elements for simplicity, the NAS functions could also be performed in separate pieces of equipment. Sirnilarly, the other elements such as a local network and router are not shown for simplicity.))

Figure 13:
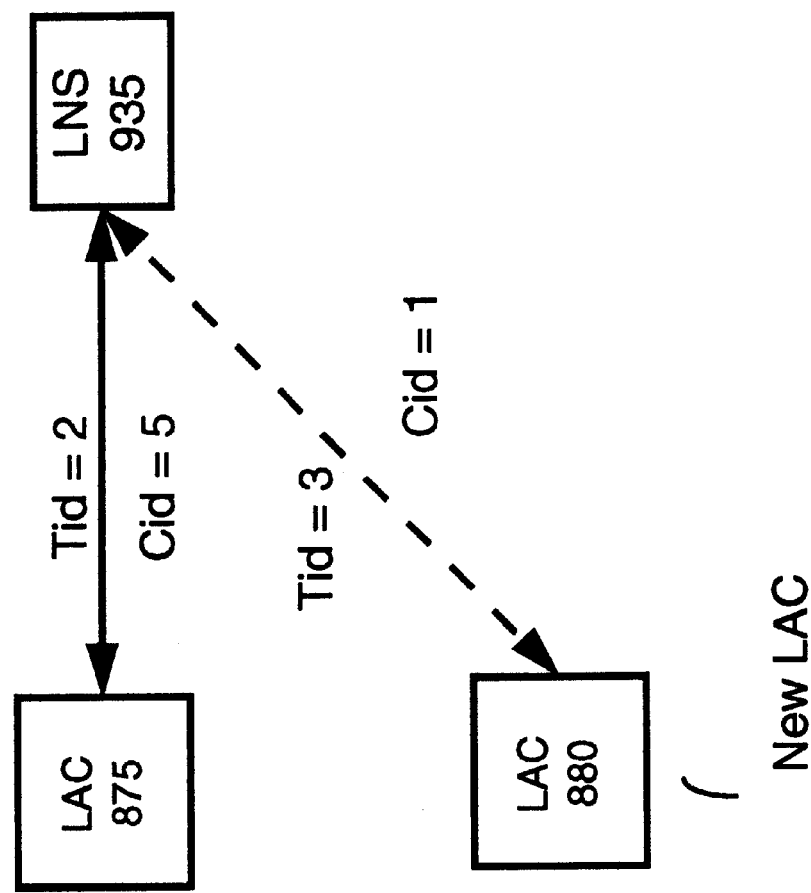
FIG. 13 shows an illustrative hand-off message flow.

In this embodiment, the same hand-off procedure is carried out for the LAC/LNS pair except that the above-described CCRQ, CCRP, CCCN messages are exchanged between the new LAC and LNS. In accordance with the inventive concept, an illustrative hand-off message flow is shown in FIG. 13. As can be observed from FIG. 13, a tunnel (identified by a Tid value) and a call (identified by a Cid value) are initially established between element 875, which includes a LAC, and LNS 935. As shown in FIG. 13, the inventive concept allows the existing LAC to transfer the existing PPP connection to a new LAC, as represented by element 880.

Figure 14:
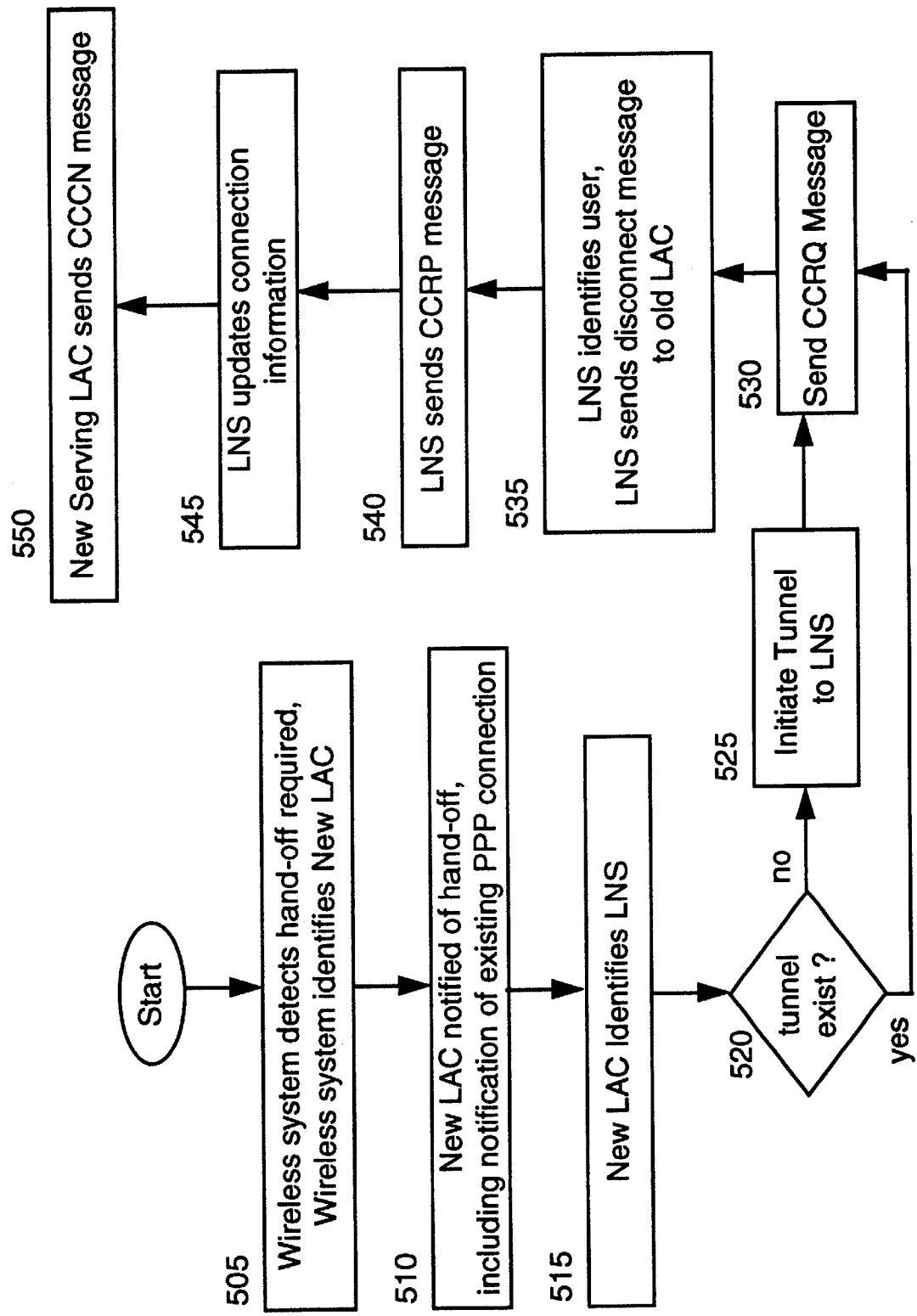
FIG. 14 shows a flow chart of an illustrative method for use in the communications system of FIG. 12.

Reference should now be made to FIG. 14, which is an illustrative flow chart of a method for use in providing a "hand-off feature." As noted, it is assumed that a VPN session exists between PC 805 and the Corporate network via element 875, which includes a LAC. In accordance with the inventive concept, PCS wireless network 910 adds to the existing call state variables additional variables indicating the presence (or lack thereof) of a PPP connection for each wireless call, and if a PPP connection exists, PPP connection information that includes the LNS identification, e.g., the IP address of the LNS.

In step 505 of FIG. 14, PCS wireless network 910 detects the need for a hand-off because PC 805 has moved from the geographical area served by element 875 to another geographical area, e.g., the area served by element 880, which includes another LAC. In step 510, PCS Wireless system provides element 880 with notification of the impending hand-off (The method(s) used by a wireless system to detect and prosecute a hand-off are known in the art and not relevant to the inventive concept. As such, they will not be described herein and are represented by signaling path 911 of FIG. 12.) Since the call state information now includes a PPP session indicator and PPP call information, the new LAC (of element 880) identifies the LNS in step 515. In step 520, the new LAC (of element 880) checks to see if there is an existing tunnel between itself and the identified LNS, here LNS 935.

If no tunnel exists, the new LAC first establishes a tunnel (as described earlier) in step 525. Then, and in accordance with the inventive concept, the new LAC sends a Continued-Call-Request (CCRQ) message to the LNS in step 530. This CCRQ message includes the user's name associated with the existing PPP connection, the Tid and Cid values to be used for the transferred (new) PPP session.

In step 535, the LNS recovers the user's name from the received CCRQ message and uses this information to determine the IP address of the old LAC (this recovered information could also include the respective User Datagram Protocol (UDP) port number). In this step, the LNS sends a Call-Disconnect-Notify message (e.g., see L2TP) to the old LAC and also identifies in, e.g., a connection table similar to that shown .in Table Four, above, but sans the Serving LAC information etc., the existing call variables associated with this PPP connection to the remote user, such as old tunnel-id, and old call-id. (On the other hand, if the LNS should reject the Continued-Call-Request, the new LAC either sends a signal back to the user so that the existing PPP session can be torn down and a new PPP session can be initiated or the PPP session is simply dropped (steps not shown).)

In step 540, the LNS replies with a Continued-Call-Reply (CCRP) message with an appropriate Receive Window Size. The CCRP message includes information on the current Nr and Ns values. In step 545, the LNS updates its connection table by replacing the entries for the Tid, Cid; and LAC EP address fields (identified in step 535), with the new call information for the existing PPP connection. In step 550, the new LAC updates the Nr, Ns, and receive window size from the received CCRP message, if necessary, and sends a Continued-Call-Connect (CCCN) message to the LNS, which completes the hand-off.

Figure 15:
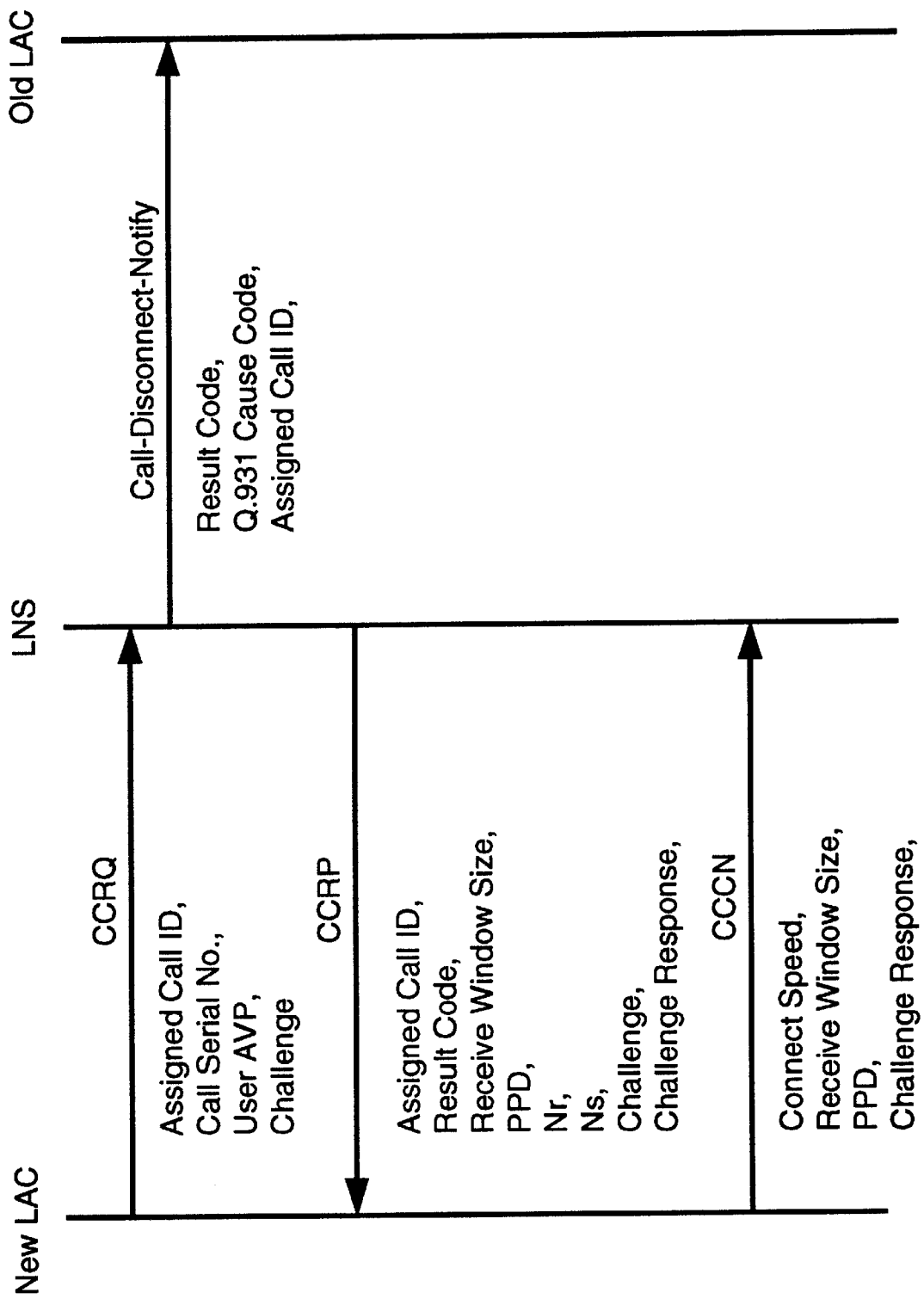
FIG. 15 shows illustrative control message transactions.

In support of the above-described hand-off feature for a PPP protocol, FIG. 15 illustrates the above-mentioned new control message transactions in accordance with the principles of the invention. As shown in FIG. 15, a CCRQ message is sent to the identified LNS. (Alternatively, if the hand-off process does not provide information about the LNS to the new LAC, the hand-off process must then provide enough user information to the new LAC so that the new LAC can search for the LNS information using help from a Foreign Radius Server as known in the art. That is, the new LAC enquires about the LNS from a Home Radius Server via Radius Access/Response messages.) Subsequent to the CCRQ message, the LNS sends a Call-Disconnect-Notify message to the old LAC. Then, the LNS replies with a Continued-Call Reply (CCRP) message that includes the current Sr, Ss values that it maintains. Finally, the new LAC replies with a Continued-Call Connect (CCCN) message.

As described above, a PPP connection is transferred from one NAS to another NAS. In support of the newly defined messages, additional call states are defined for the respective NAS as illustrated in Tables Five and Six, below.

TABLE FIVE

New LAC (or NAS)

| Call State | Event | Action | New State |
|---|---|---|---|
| idle | hand-off notification | Send CCRQ | wait-CCRP-reply |
| wait-CCRP-reply | Receive CCRP, not accepted, | Clean-up | idle |
| wait-CCRP-reply | Receive CCRP, accepted, | Send CCCN | established, |

As can be observed, the additional, or, new, call state for mL2TP associated with the new LAC (or NAS) for a continued call is the wait-CCRP-reply state.

It should be noted that for the old LAC (or NAS), a Call-Disconnect-Notify (CDN) Message is received while in the established state. In response, the old LAC cleans up and disconnects the call, and returns to the idle state.

TABLE SIX

Anchor LAC, or LNS

| Call State | Event | Action | New State |
|---|---|---|---|
| established | Received CCRQ, not accepted, | Send CCRP, with error code, Send CDN to LNS, | idle, |
| established | Receive CCRP, accepted, | Send CDN to old LAC, Send CCRP to new LAC, | wait-CCCN |
| wait-CCCN | Receive CCCN | get ready for data, | established, |
| wait-CCCN | Receive CDN | Clean-up, | Idle, |

As can be observed, the additional, or, new, call state for mL2TP associated with the Anchor LAC, or LNS, for a continued call is the wait-CCCN state.

Payload Message Overviews and Conestion Control for mL2TP

With respect to payload messages for mL2TP, the Serving LAC and the LNS follow L2TP procedures. The Anchor LAC swaps the Tid and Cid for the payload packets. The Anchor LAC also monitors the (Nr, Ns) values sent by the Serving LAC. (It should be noted that since there may be packet losses between the Serving LAC and the Anchor LAC, it is expected that both the Sr and Ss values at the Anchor LAC may be lagging behind those values maintained at the Serving LAC.) The Anchor LAC does not change the (Nr, Ns) of the payload packets in either directions. The Anchor LAC only makes use of its own Sr, Ss values when it receives a Continued-Call Request message from a new Serving LAC.

With respect to congestion control, the L2TP requirements on when to abide to receive window size, when to send Nr/Ns, and when to send an ACK apply to mL2TP. In addition, mL2TP also has the following additional requirements for the Serving LAC and the Anchor LAC.

The Anchor LAC is required to monitor the (Nr, Ns) value sent by the Serving LAC. The Anchor LAC should include the (Sr, Ss) value it maintains in the Continued-Call-Reply message when it replies to the Continued-Call-Connect message it receives from a Serving LAC. Since a network between the Serving LAC and an Anchor LAC is lossy, the Sr value maintained by an Anchor LAC may be lagging behind the Serving LAC.

In addition, the Serving LAC implements a full receiver rather than a simple receiver, as referred to in the art. This requirement is to prevent the new Serving LAC from passing out-of-sequence or duplicate packets to upper layers when there is a change of Serving LAC during the lifetime of a PPP session.

Figure 16:
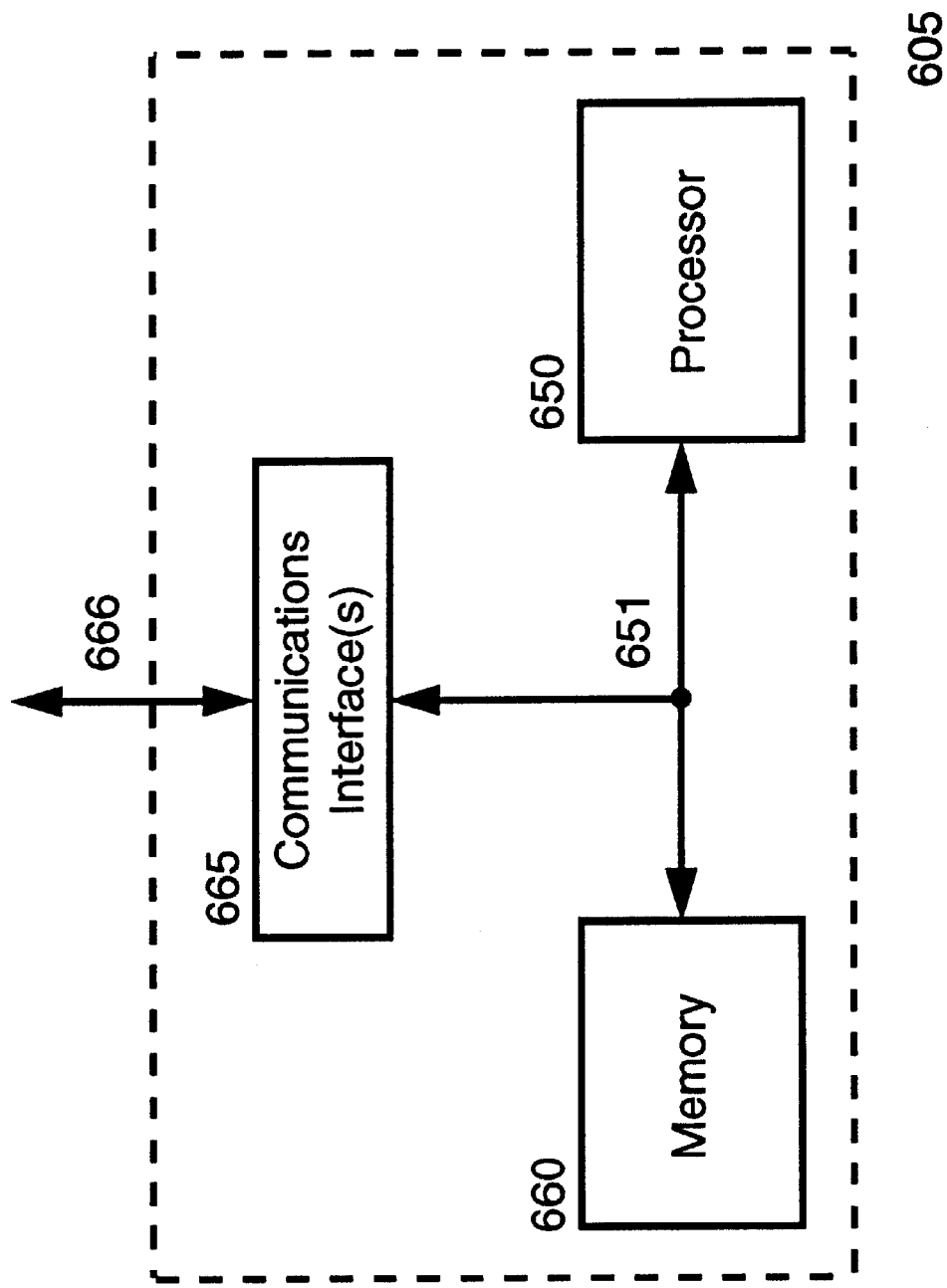
FIG. 16 shows an illustrative high level block diagram of Network Access Server.

Turning briefly to FIG. 16, a high level block diagram of a representative NAS is shown. An NAS is a stored-program-control based processor architecture and includes processor 650, memory 660 (for storing program instructions and data, e.g., the above-mentioned connection tables, etc.) and communications interface(s) 665 for coupling to one or more communication facilities as represented by path 666.

Figure 17:
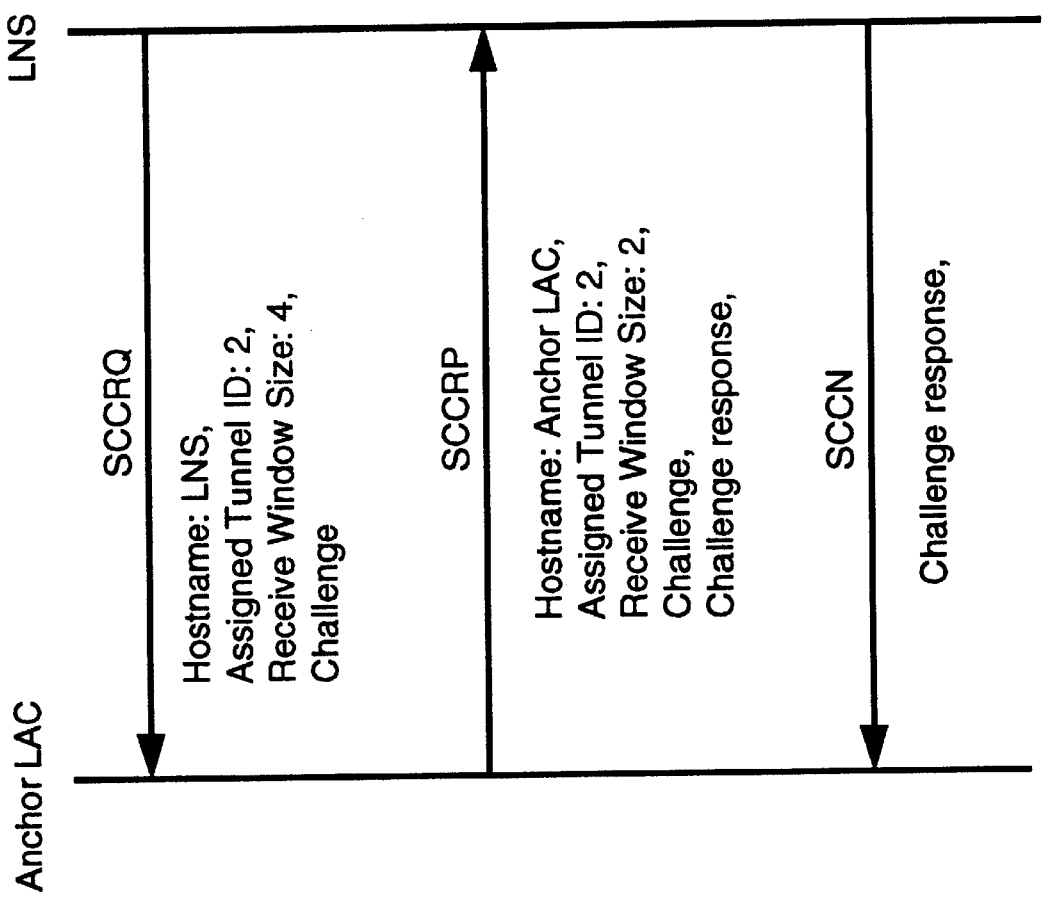
FIGS. 17–18 show illustrative control message transactions for outgoing calls.
Figure 18:
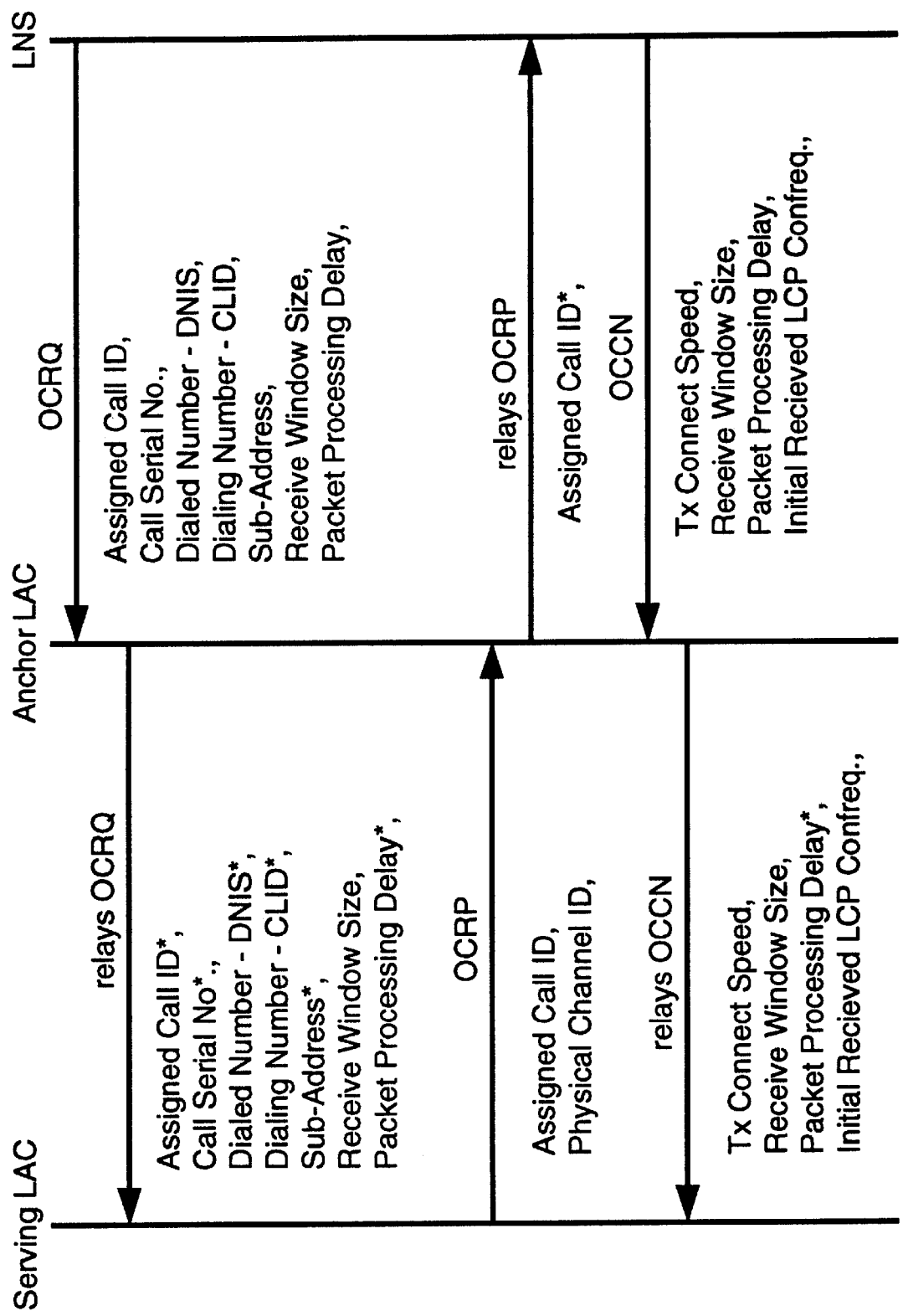

The foregoing merely illustrates the principles of the invention and it will thus be appreciated that those skilled in the art will be able to devise numerous alternative arrangements which, although not explicitly described herein, embody the principles of the invention and are within its spirit and scope. For example, although the inventive concept was described in the context of a Serving NAS initiating the establishment of a multi-hop tunnel for incoming calls, the inventive concept is equally applicable to, e.g., the LNS initiating the establishment of a multi-hop sequence for outgoing calls. Such modifications are straightforward and will not be described herein as illustrated by FIGS. 17–18.

What is claimed:

1. A method for use in a packet server, the method comprising the steps of:
    establishing a multi-hop packet tunnel between other packet endpoints; and
    relaying messages between the other packet endpoints over the multi-hop packet tunnel, wherein the relaying step includes the step of modifying packet processing delay information included in any of the messages to include a packet processing delay for the packet server before relaying these messages between the other packet endpoints.

2. The method of claim 1 wherein the establishing step includes the steps of:
    establishing a first packet tunnel to one packet endpoint; and
    establishing a second packet tunnel to another packet endpoint.

3. The method of claim 2 further comprising the step of tracking connection information, the connection information including a tunnel identification value for the first packet tunnel and a tunnel identification value for the second packet tunnel.

4. The method of claim 1 wherein the relaying step includes the step of modifying at least some of the messages before relaying them between the other packet endpoints.

5. The method of claim 1 wherein the relaying step includes the step of modifying tunnel identification information in at least some of the messages before relaying them between the other packet endpoints.

6. The method of claim 1 wherein the packet server uses an Internet Protocol that supports multiple tunnels.

7. The method of claim 6 wherein the Internet Protocol is a form of Layer 2 Tunneling Protocol.

8. A method for use in a packet server for providing a virtual dial-up service, the method comprising the steps of:
establishing a first packet tunnel with a first packet server;
establishing a second packet tunnel with a second packet server; and
relaying messages between the first packet tunnel and the second packet tunnel, wherein the relaying step includes the step of modifying packet processing delay information included in any of the messages to include a packet processing delay for the packet server before relaying these messages between the first and the second packet tunnel.

9. The method of claim 8 wherein the establishing a first packet tunnel step includes the step of receiving a message from the first packet server including information identifying the first packet server and a tunnel identifier for the first packet tunnel.

10. The method of claim 8 wherein the relaying step includes the step of modifying at least some of the messages before relaying them between the first and the second packet tunnels.

11. The method of claim 8 further comprising the step of tracking connection information, the connection information including a tunnel identification value for the first packet tunnel and a tunnel identification value for the second packet tunnel.

12. The method of claim 8 wherein the relaying step includes the step of modifying tunnel identification information in at least some of the messages before relaying them between the first packet tunnel and the second packet tunnel.

13. A packet server comprising:
a processing element for causing to be established a first packet tunnel to one packet endpoint and a second packet tunnel to another packet endpoint; and
a memory element for storing connection information relating the two packet tunnels together, wherein the process causes modification of packet processing delay information included in any of the messages to include a packet processing delay for the packet server before causing them to be relayed between the other packet endpoints.

14. The apparatus of claim 13 wherein the processing element causes messages to be relayed between the first packet tunnel and the second packet tunnel.

15. The apparatus of claim 14 wherein the processor causes modification of tunnel identification information in at least some of the messages before causing them to be relayed between the other packet endpoints.

16. A packet server apparatus of the type used to provide access to a virtual private network service, the packet server characterized by a multi-hop tunnel protocol such that the packet server relays message between different tunnels connected to other packet servers, wherein the packet server modifies packet processing delay information included in any of the messages to include a packet processing delay for the packet server before relaying these messages between hops.

17. The apparatus of claim 16 wherein the packet server modifies at least some of the messages before relaying them between hops.

18. The apparatus of claim 16 wherein the packet server modifies tunnel identification information in at least some of the messages before relaying them between hops.

19. A method for use in a packet server for providing access to a virtual private network (VPN) service at a location other than a user's anchor location, the method comprising the steps of:
accepting point-to-point protocol connections with users for accessing the virtual private network service, said point to point connections establishing a VPN connection with a server LAC device to enable an alternate VPN connection location; and
causing to be established a first packet tunnel between said anchor LAC device and said server LAC device using predetermined messages of a modified protocol and to establish a second packet tunnel to another packet endpoint; such that the packet server is disposed between hops and relays messages between hops.

20. The method of claim 19 wherein the accepting multi-hop tunnel connections step includes the step of modifying at least some of the messages before relaying them between hops.

21. The method of claim 19 wherein the accepting multi-hop tunnel connections step includes the step of modifying tunnel identification information in at least some of the messages before relaying them between hops.

22. The method of claim 19 wherein the accepting multi-hop tunnel connections includes the step of modifying packet processing delay information included in any of the messages to include a packet processing delay for the packet server before relaying these messages between hops.

23. The method of claim 19 wherein the packet server uses an Internet Protocol that supports multiple tunnels.

24. The method of claim 23 wherein the Internet Protocol is a form of Layer 2 Tunneling Protocol.

25. The method of claim 19, wherein said messages are selected from the group consisting of start-control-connect request, start-control-connect-reply and start-control-connection -connect.

26. Apparatus for use in a packet network, the apparatus comprising:
a packet server for a) accepting point-to-point protocol connections with users for accessing the virtual private network service and b) accepting multi-hop tunnel connections with other packet servers to establish alternate connection locations for said users, said server utilizing predetermined messages of a modified protocol to extend a virtual private network connection to said alternate locations using said multi-hop tunnel locations, such that the packet server is disposed between hops and relays messages between hops.

27. The apparatus of claim 26, wherein the packet server modifies at least some of the messages before relaying them between hops.

28. The apparatus of claim 26 wherein the packet server modifies tunnel identification information in at least some of the messages before relaying them between hops.

29. The apparatus of claim 26 wherein the packet server modifies packet processing delay information included in any of the messages to include a packet processing delay for the packet server before relaying these messages between hops.

30. The method of claim 26, wherein said messages are selected from the group consisting of start-control-connect request, start-control-connect-reply and start-control-connection connect.

31. An anchor LAC device capable of establishing a VPN connection with a server LAC device to enable an alternate VPN connection location to a user comprising:
a processing element for causing to be established a first packet tunnel between said anchor LAC device and said server LAC device using predetermined messages of a modified L2TP protocol and to establish a second packet tunnel to another packet endpoint; and a memory element for storing connection information relating the two packet tunnels together, said first packet tunnel enabling said VPN connection to occur through said server LAC.

* * * * *